United States Patent
Honig

(10) Patent No.: US 9,403,416 B2
(45) Date of Patent: Aug. 2, 2016

(54) METHOD AND DIAGNOSTIC TESTER FOR DETECTING A FAULT IN A COOLING CIRCUIT OF A MOTOR VEHICLE

(75) Inventor: Benno Honig, Pforzheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 32 days.

(21) Appl. No.: 14/006,826

(22) PCT Filed: Feb. 15, 2012

(86) PCT No.: PCT/EP2012/052555
§ 371 (c)(1),
(2), (4) Date: Nov. 26, 2013

(87) PCT Pub. No.: WO2012/126678
PCT Pub. Date: Sep. 27, 2012

(65) Prior Publication Data
US 2014/0074349 A1    Mar. 13, 2014

(30) Foreign Application Priority Data
Mar. 23, 2011   (DE) .......................... 10 2011 005 928
Apr. 7, 2011    (DE) .......................... 10 2011 006 970

(51) Int. Cl.
*B60H 1/00*    (2006.01)
*F25B 49/00*   (2006.01)
(Continued)

(52) U.S. Cl.
CPC ........ *B60H 1/00585* (2013.01); *B60H 1/00978* (2013.01); *F25B 45/00* (2013.01); *F25B 49/005* (2013.01); *G01M 15/042* (2013.01); *F25B 2700/1931* (2013.01)

(58) Field of Classification Search
CPC .............. F25B 49/005; F25B 2500/222; F25B 2700/04; F25B 2700/1931; F25B 2700/195; F25B 2700/2106; F25B 2700/21163; F25B 2700/1933; F25B 2700/21152; F25B 2345/002; F25B 2345/007; F25B 2400/0403; F25B 2400/0411; F25B 2400/12; F25B 2400/22; F25B 2500/18; F25B 2500/24; F25B 2600/02; F25B 2600/111; B60H 1/00428; B60H 1/00585; B60H 2001/3266; B60H 1/00378; B60H 2001/3255; B60H 1/00778; B60H 1/3205; B60H 1/3214; B60H 1/323; B60H 2001/325
See application file for complete search history.

(56) References Cited

U.S. PATENT DOCUMENTS 4,755,957 A * 7/1988 White et al. .................. 702/184
5,481,884 A * 1/1996 Scoccia ........................ 62/129
(Continued)

FOREIGN PATENT DOCUMENTS

CN    101086369 A    12/2007
EP    1177924        2/2002
(Continued)

OTHER PUBLICATIONS
International Search Report for PCT/EP2012/052555, issued on May 23, 2012.

*Primary Examiner* — Truc M Do
(74) *Attorney, Agent, or Firm* — Norton Rose Fulbright US LLP

(57) ABSTRACT

A method for detecting a fault in a cooling circuit of a motor vehicle, the cooling circuit having, in the flow direction of a refrigerant, a compressor, a condenser, an expansion device and an evaporator, includes the following steps: measuring a first refrigerant pressure when the compressor is turned off; turning on the compressor; and is characterized by the steps: measuring a second refrigerant pressure after a certain time interval; forming a differential value from the second refrigerant pressure measured previously and the first refrigerant pressure; and comparing the differential value with at least one differential value for detecting a fault in the cooling circuit.

13 Claims, 2 Drawing Sheets

(51) Int. Cl.
*G01M 15/04* (2006.01)
*F25B 45/00* (2006.01)

(56) References Cited

U.S. PATENT DOCUMENTS

| | | | |
|---|---|---|---|
| 5,987,903 A | 11/1999 | Bathla | |
| 6,434,956 B1* | 8/2002 | Ota et al. | 62/133 |
| 6,732,538 B2* | 5/2004 | Trigiani et al. | 62/129 |
| 7,082,380 B2* | 7/2006 | Wiebe et al. | 702/182 |
| 7,146,290 B2* | 12/2006 | Triginai et al. | 702/182 |
| 7,987,679 B2* | 8/2011 | Tanaka et al. | 62/129 |
| 8,474,278 B2* | 7/2013 | Pham | F04C 28/00 62/115 |
| 8,974,573 B2* | 3/2015 | Kates | 95/26 |
| 2002/0040280 A1* | 4/2002 | Morgan | 702/114 |
| 2003/0055603 A1* | 3/2003 | Rossi et al. | 702/185 |
| 2003/0230106 A1 | 12/2003 | Takano et al. | |
| 2004/0111186 A1* | 6/2004 | Rossi et al. | 700/276 |
| 2010/0186430 A1* | 7/2010 | Johnston et al. | 62/77 |
| 2010/0324376 A1* | 12/2010 | Chinnadurai et al. | 600/300 |
| 2013/0319025 A1* | 12/2013 | Wagaman et al. | 62/149 |

FOREIGN PATENT DOCUMENTS

| | | |
|---|---|---|
| JP | 2001-212143 | 8/2001 |
| JP | 2004-17681 | 1/2004 |

* cited by examiner

METHOD AND DIAGNOSTIC TESTER FOR DETECTING A FAULT IN A COOLING CIRCUIT OF A MOTOR VEHICLE

FIELD OF THE INVENTION

The present invention relates to a method and a diagnostic tester for detecting a fault in a cooling circuit of a motor vehicle.

BACKGROUND INFORMATION

During servicing of an air conditioning system of a motor vehicle, the cooling circuit of the air conditioning system is tested regularly for faults. To be able to detect such a fault in a cooling circuit, in the known methods, a plurality of measured values is interpreted and analyzed manually by a mechanic. This requires extensive knowledge of the system as well as a great deal of experience on the part of the mechanic while also being very time-consuming and expensive.

SUMMARY

An object of the present invention is to provide a simple and inexpensive method and a corresponding diagnostic tester for reliably detecting a fault in a cooling circuit of a motor vehicle.

In comparison with conventional methods for detecting a fault in a cooling circuit, the method according to the present invention offers the advantage that it is possible to immediately detect or rule out a fault in a cooling circuit of a motor vehicle. In conventional methods, it is usually necessary for a plurality of measured parameters to be interpreted and analyzed by a mechanic. This requires a great deal of experience and a very good understanding of the thermodynamic processes involved in the cooling circuit. The method according to the present invention greatly facilitates troubleshooting since a fault in the cooling circuit is detected immediately by this method. A manual evaluation of multiple measured values of the air conditioning system is not necessary, which offers time savings on the one hand while offering a greater reliability in troubleshooting on the other hand since a manual evaluation error by a mechanic is eliminated.

A cooling circuit typically used in a motor vehicle includes a closed circuit in which a refrigerant circulates and usually has, in the flow direction of the refrigerant, a compressor, a condenser, an expansion device and an evaporator. During operation of the cooling circuit, the refrigerant in the compressor is compressed to a high pressure and then conducted into the condenser. An air stream is passed through the condenser, cooling the refrigerant and condensing it completely. Following the condenser, the refrigerant is depressurized in the expansion device, and subsequently enters the evaporator, through which an air stream is passed, heating the refrigerant. The refrigerant exits the evaporator uncompressed and in a gaseous phase and is conducted back to the entrance of the compressor.

One possible fault in the cooling circuit described previously may be, for example, that the compressor does not adequately compress the refrigerant or there is leakage in the cooling circuit. According to a finding by the inventor, such a fault results in a pressure drop in the refrigerant. Such a fault is detectable in particular by a comparison between a refrigerant pressure with the compressor turned on and a refrigerant pressure with the compressor turned off, since the highest pressure difference in the cooling circuit exists between these two pressure values.

According to the present invention, a first refrigerant pressure is measured in the method step (a) while the compressor is turned off. The same refrigerant pressure prevails in the entire cooling circuit when the compressor is turned off since there is no compression of the refrigerant, so that the first measured refrigerant pressure is the lowest refrigerant pressure occurring in the cooling circuit.

When the compressor is turned on in step (b), the refrigerant pressure is increased in the cooling circuit, in particular in a high-pressure area between the compressor outlet and the inlet of the expansion device.

In step (c), a second refrigerant pressure is measured after a certain time interval. The second refrigerant pressure is the pressure prevailing in the cooling circuit after turning on the compressor. In contrast with the first measured refrigerant pressure, the second refrigerant pressure of an intact cooling circuit is significantly higher. The time interval between measuring the first refrigerant pressure and measuring the second refrigerant pressure is selected to be long enough to build up a constant pressure by the compressor in the cooling circuit.

In step (d) the differential value between the second measured refrigerant pressure and the first measured refrigerant pressure is formed. This differential value represents the pressure increase in the refrigerant, which is caused by turning on the compressor in step (b).

In step (e) the differential value calculated previously is compared with a reference value for detecting a fault in the cooling circuit. The differential value, which represents the pressure increase in the cooling circuit, is an indicator for a fault in the cooling circuit. If the pressure increase between the compressor turned on and the compressor turned off is too low, it may be inferred therefrom that there is a fault in the cooling circuit. The reference value represents the pressure increase caused by turning on the compressor with an intact cooling circuit. A fault in the cooling circuit may be detected directly by comparing the differential value with the reference value.

The differential value is calculated from:

$$\Delta p = p(t2) - p(t1),$$

where $p(t1)$ represents the refrigerant pressure at the point in time of the first measurement of the refrigerant pressure, and $p(t2)$ represents the refrigerant pressure at the point in time of the second measurement of the refrigerant pressure.

A fault in the cooling circuit is present when:

$$\Delta p < \text{reference value}.$$

There is no fault in the cooling circuit when:

$$\Delta p \geq \text{reference value}.$$

Such a reference value is ascertained from experiments on intact cooling circuits under various ambient conditions and may be in tabular form for comparison with the differential value, for example.

According to a first specific embodiment of the present invention, steps (d) and (e) are carried out by a diagnostic tester. In such a diagnostic tester, the differential value is calculated and then compared with the reference value. The presence of a fault in the cooling circuit may then be indicated to a mechanic.

According to another specific embodiment of the present invention, the motor vehicle has an engine which is turned on prior to step (a), the engine being in idling mode during the measurements. The compressor and the fan, for example, may be driven by the engine of the motor vehicle. Turning on the engine prior to step (a), measuring the first refrigerant pressure offers the advantage that the engine of the motor vehicle is already running at a constant rotational speed when the compressor is subsequently turned on and a startup phase of the engine has no effect on the performance of the compressor.

In addition, a temperature preselection of the cooling circuit is set to "cold." Such a temperature preselection regulates the temperature of the air stream flowing into the compartment and produces the greatest possible cooling of the air stream when set to "cold."

It is necessary here that the compressor runs under full load in the subsequent test at which the greatest compression of the refrigerant is achieved. The greatest possible differential value is thus ascertained in step (e) and a fault in the cooling circuit is easier to detect.

Furthermore, during the measurements, the ambient temperature is preferably higher than 5° C. This temperature range, in which the ambient temperature is higher than 5° C., represents the temperature range in which an air conditioning system of a motor vehicle may generally be used.

In another specific embodiment, the engine is kept running for a period of 10 seconds to 30 seconds, in particular for about 20 seconds prior to step (a). This ensures that constant conditions are established in the engine of the motor vehicle. The engine of the motor vehicle has preferably reached constant operating conditions before the compressor is activated and it drives the compressor, which is subsequently turned on, at a constant rotational speed.

According to another specific embodiment of the present invention, the time interval from turning the compressor on until the second refrigerant pressure is measured amounts to 10 seconds to 50 seconds, in particular about 30 seconds. During this time interval, the pressure in the cooling circuit increases. The compressor requires a certain amount of time to build up a constant pressure in the cooling circuit. A measurable differential value is established between the first refrigerant pressure and the second refrigerant pressure only after a certain startup time of the compressor. The pressure increase in the cooling circuit may be described ideally by a straight line having a constant slope. However, the actual pressure increase in a cooling circuit is initially somewhat flatter, ultimately increasing with an approximately constant slope up to the high-pressure value of the cooling circuit. A time interval of 10 seconds to 50 seconds ensures that a measurable pressure difference has been established in an intact cooling circuit and the startup range of the compressor in which the pressure increases only slightly has been exceeded.

According to another specific embodiment of the present invention, the reference value is a function of the first refrigerant pressure with the compressor turned off, the time interval from the activation of the compressor until measuring the second refrigerant pressure and the ambient temperature. The first refrigerant pressure with the compressor turned off is variable and depends on the filling level of the cooling circuit and the temperature of the refrigerant, among other things. The refrigerant pressure in the cooling circuit when the compressor is turned off should be at least +2 bar to be able to operate the cooling circuit. The pressure of the cooling circuit does not necessarily increase linearly over time but instead is ascertained for the corresponding time interval between the measurements. Furthermore, the pressure increase in a cooling circuit is not linearly dependent on the ambient temperature and the initial refrigerant pressure when the compressor is turned off. The corresponding reference value is therefore ascertained under various conditions in an intact cooling circuit.

In another specific embodiment of the present invention, a fault in the cooling circuit is detected when the differential value is lower than a reference value. The differential value describes the actual pressure increase in the cooling circuit, whereas the reference value describes the ideal pressure increase in an intact cooling circuit. If the differential value is lower than the reference value, then the pressure increase in the cooling circuit is less than the pressure increase in an intact cooling circuit. It may be inferred therefrom that there is a fault, for example, a defective compressor or a leak in the circuit.

In another specific embodiment, the measurements of the refrigerant pressure are carried out at a location in the cooling circuit just downstream from the compressor, where the pressure increase of the refrigerant due to the activation of the compressor is directly measurable since there are no other components between the measuring device and the compressor.

It is also advantageous to measure the refrigerant pressure at a location in the cooling circuit between the condenser and the expansion device since the temperature of the refrigerant is lower in this region than that after exiting the compressor. It is then not necessary to design the measuring device to be high-temperature-resistant.

The method according to the present invention may be carried out with the aid of a diagnostic tester connected to a control unit of a motor vehicle, in particular an engine system control unit or an air conditioning system control unit.

Furthermore, the present invention relates to a diagnostic tester for ascertaining a fault in the cooling circuit described above. Such a diagnostic tester implements the advantages of the method described above for ascertaining a fault in a cooling circuit. All specific embodiments described with reference to this method and all advantages associated with it also apply correspondingly to the diagnostic tester for ascertaining a fault in a cooling circuit.

In another specific embodiment, the diagnostic tester is designed for connection to a control unit, in particular a motor vehicle engine control unit or a motor vehicle air conditioning system control unit.

DETAILED DESCRIPTION

Figure 1:
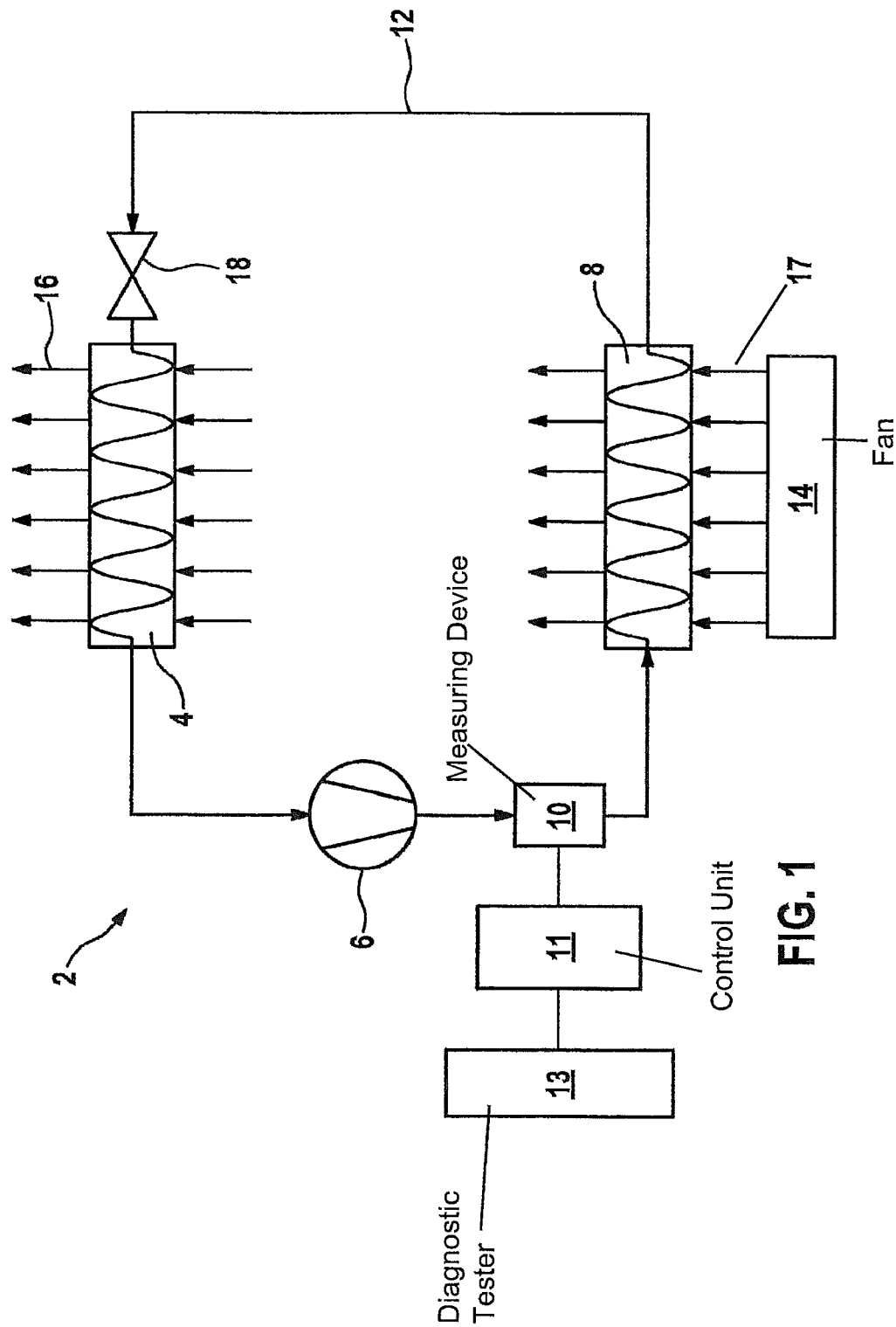
FIG. 1 shows a schematic diagram of a cooling circuit in a motor vehicle having a control unit and a diagnostic tester.

FIG. 1 schematically shows a cooling circuit 2 having a control unit 11 and a diagnostic tester 13 of a motor vehicle, in which a refrigerant 12 circulates. Cooling circuit 2 has, in the flow direction of refrigerant 12, an evaporator 4, a compressor 6, a measuring device 10, a condenser 8 and an expansion device 18.

Refrigerant 12 is compressed in compressor 6, where the pressure of gaseous refrigerant 12 is increased to a high pressure. Measuring device 10, in which the pressure of refrigerant 12 is measured, is situated between compressor 6 and condenser 8. Gaseous refrigerant 12 is then cooled against a condenser air stream 17 in condenser 8 and is completely condensed.

Condenser air stream 17 is an air stream from a fan 14, which blows ambient air through condenser 8 or draws the ambient air through it. Condenser 8 in FIG. 1 includes a heat exchanger through which condenser air stream 17 flows and which cools refrigerant 12, so that the refrigerant condenses completely. In the process, condenser air stream 17 absorbs the heat which refrigerant 12 releases for complete condensation. Heated condenser air stream 17 is discharged into the surroundings. Refrigerant 12 is then decompressed to a low pressure in expansion device 18, thereby cooling down and then entering evaporator 4. Heat is supplied to the refrigerant via an evaporation air stream 16 which is drawn in from the surroundings. In the heat exchange with refrigerant 12, evaporation air stream 16 cools down and is then supplied to the passenger compartment of a motor vehicle. Gaseous refrigerant 12 is returned to the entrance of compressor 6 downstream from evaporator 4.

FIG. 1 also shows a control unit 11 connected to measuring device 10 and a diagnostic tester 13 also connected to the control unit. Control unit 11 is a motor vehicle engine control unit or a motor vehicle air conditioning system control unit by which compressor 6 and fan 14 are typically controllable. A diagnostic tester 13 is usually connected to control unit 11 of the motor vehicle in a shop environment and is able to receive measured values from measuring device 10 for analysis. Furthermore, the time intervals between turning on the engine and measuring the first refrigerant pressure and turning on the compressor until measuring the second refrigerant pressure may be established by diagnostic tester 13 and transmitted to control unit 11, which subsequently controls the engine and the cooling circuit accordingly.

Figure 2:
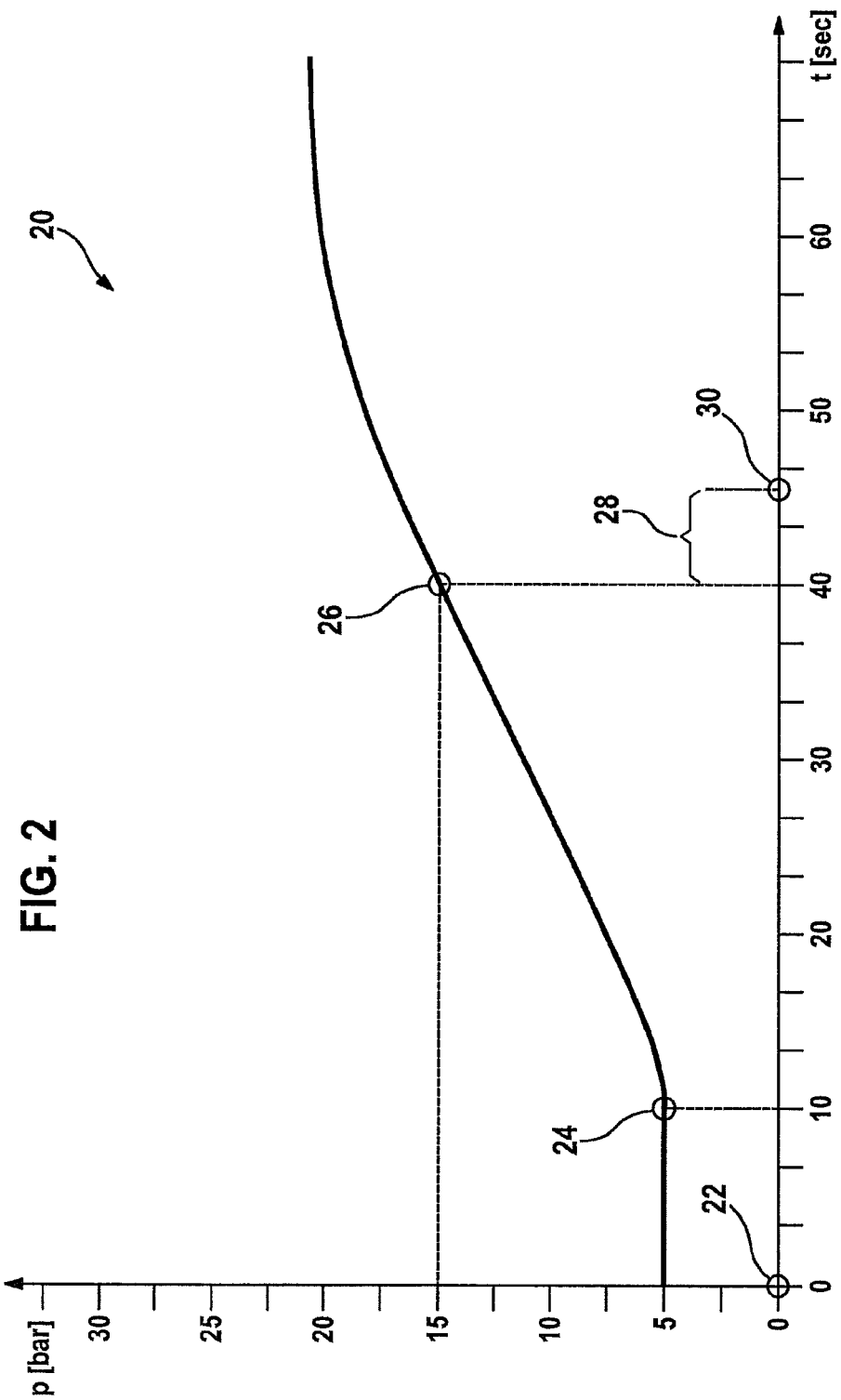
FIG. 2 shows a schematic diagram of the pressure curve of a refrigerant at a location in a cooling circuit according to FIG. 1.

FIG. 2 shows an exemplary pressure curve diagram 20 of the refrigerant pressure on measuring device 10 in cooling circuit 2 from FIG. 1. The refrigerant pressure is shown in a diagram, where the pressure in bar is plotted on the ordinate and the time in seconds is plotted on the abscissa. The pressure curve in FIG. 2 is shown over a period of 70 seconds, where the pressure initially remains constant and then increases steadily, approaching a value of about 20 bar. The pressure curve increases more steeply at the beginning and then flattens out, finally assuming an approximately constant pressure value. The pressure curve shown in FIG. 2 is an empirical curve of the refrigerant pressure after turning on compressor 6, first and second measuring points 24, 26 being plotted in the diagram.

The pressure curve diagram shown in FIG. 2 describes the pressure curve of a refrigerant 12 of an intact cooling circuit 2 according to FIG. 1, the compressor being turned on at first measuring point 24. The pressure curve is shown over a period of a test method for detecting a fault in cooling circuit 2, starting point 22 of the test being at T=0 sec and a refrigerant pressure of 5 bar.

For carrying out the test method, a few necessary prior conditions are to be met, including the fact that compressor 6 of cooling circuit 2 from FIG. 1 is turned off at starting point 22 and fan 14 for heat exchange of condenser 8 and evaporator 4, with air stream 16, 17 created by fan 14 preferably being turned on at starting point 22. In addition, the engine of the motor vehicle is also turned on at starting point 22 of the test and is preferably idling over the entire duration of the measurement. During the test, the ambient temperature is higher than 5° C. Furthermore, at starting point 22, the temperature preselection of an air conditioning system operating unit inside the motor vehicle is set to "cold."

The refrigerant pressure of 5 bar prevailing at starting point 22 in the diagram in FIG. 2 is exemplary for a refrigerant pressure with compressor 6 turned off. The refrigerant pressure may vary as a function of the ambient conditions and of the filling level of cooling circuit 22. To be able to carry out the test described below for detecting a fault in cooling circuit 2, the refrigerant pressure is at least +2 bar at starting point 22. Furthermore, cooling circuit 2 should not be freshly filled since any minor leak which might be present would not be detected.

The engine of the motor vehicle may operate compressor 6 and fan 14 in cooling circuit 2, for example. The temperature preselection "cold" causes the greatest possible cooling of air stream 14, 17 and thus ensures that compressor 6 will run under full load in cooling circuit 2 during the subsequent test.

At measuring point 24, compressor 6 may be turned on manually by a user or by a command of control unit 11 connected to compressor 6.

After starting point 22 of the test, the pressure remains constant over a period of 10 seconds until first measuring point 24, the period of 10 seconds representing an exemplary value. For carrying out the test, this value should be within the range of 10 seconds to 30 seconds, in particular about 20 seconds. This period serves to establish a constant operating state in cooling circuit 2.

A first refrigerant pressure of refrigerant 12 is measured at first measuring point 24 with compressor 6 turned off. The pressure of refrigerant 12 measured at first measuring point 24 is then transmitted by measuring device 10 to diagnostic tester 13 and is stored there. In addition, compressor 6 of cooling circuit 2 is turned on at first measuring point 24.

When compressor 6 is turned on at first measuring point 24, the pressure of refrigerant 12 begins to increase in the diagram in FIG. 2 since compressor 6 is compressing refrigerant 12 in cooling circuit 2. The increase in the refrigerant pressure shown in FIG. 2 is initially somewhat flatter and then increases relatively constantly up to second measuring point 26, at which a second measured value is measured by measuring device 10.

Second measuring point 26 occurs 30 seconds after first measuring point 24 in the diagram shown in FIG. 2. At second measuring point 26, the second refrigerant pressure is measured by measuring device 10 and is stored in diagnostic tester 13. The time interval from the activation of the compressor at first measuring point 24 until the measuring of the second refrigerant pressure at the measuring point 26 amounts to 30 seconds in the exemplary embodiment shown here. This is merely one exemplary value for a time interval required for reliably carrying out the method for detecting a fault in cooling circuit 2. The time interval between first measuring point 24 and second measuring point 26 should preferably be between 10 seconds and 50 seconds, in particular 30 seconds, so that the second refrigerant pressure is measured at a point in time at which a significant pressure increase in refrigerant 12 in an intact cooling circuit 2 is ascertainable in comparison with the refrigerant pressure at first measuring point 24.

The pressure of refrigerant 12 in pressure curve diagram 20 in FIG. 2 has increased from 5 bar to 15 bar at second measuring point 26, so this is an exemplary value for a refrigerant pressure, which prevails at second measuring point 26 in an intact cooling circuit 2.

Following second measuring point 26, FIG. 2 shows an evaluation period 28 in which the measured values of the refrigerant pressure recorded at first measuring point 24 and at second measuring point 26 are evaluated. For this evaluation, the difference between the second refrigerant pressure at second measuring point 26 and the first refrigerant pressure at first measuring point 24 is formed. This differential value is compared with a reference value for detecting a fault in cooling circuit 2. Such a reference value describes a minimum pressure increase of refrigerant 12 in an intact cooling circuit 2, which is typical of the time interval between first measuring point 24 and second measuring point 26. This reference value is ascertained from experiments on an intact cooling circuit 2. The reference value also depends on the first refrigerant pressure when the compressor is turned off, the time interval from turning on the compressor until measuring the second refrigerant pressure and the ambient temperature and the refrigerant used.

To detect a fault in cooling circuit 2, the differential value from the measured values of the second refrigerant pressure and the first refrigerant pressure is compared with the reference value. A fault in cooling circuit 2 is detected when the differential value is smaller than the reference value.

A fault in cooling circuit 2 is when: p(t2)−p(t1)<reference value

A fault-free cooling circuit 2 is when: p(t2)−p(t1)≥reference value, where p(t1) represents the refrigerant pressure at first measuring point 24 and p(t2) represents the refrigerant pressure at second measuring point 26.

The evaluation is carried out by diagnostic tester 13, the differential value being compared with a corresponding reference value, which corresponds to the time interval between first measuring point 24 and second measuring point 26 as well as the ambient conditions and refrigerant 12 being used. Evaluation period 28 for analysis of the measured pressure situations amounts to 5 seconds, for example, in the diagram in FIG. 2. This evaluation period 28 depends on the computing power of diagnostic tester 13. At the end point in time 30 of the test, which is shown as 45 seconds in the diagram in FIG. 2 as an example, the result of the comparison of the differential value with the reference value may be output by diagnostic tester 13, for example, to indicate to a mechanic whether there is a fault in cooling circuit 2.

The method described above offers a rapid and inexpensive method of reliably detecting a fault in a cooling circuit 2 such as a leak or a defective compressor, for example. For carrying out the method, one need only access a measuring device 10 which is already present in cooling circuit 2 and by which the refrigerant pressure is measurable at various points in time. The components of cooling circuit 2 advantageously need not be designed and tested individually to detect a fault.

What is claimed is:

1. A method for detecting a fault in a cooling circuit of a motor vehicle that includes in a flow direction of a refrigerant, a compressor, a condenser, an expansion device, and an evaporator, the method comprising:
   (a) measuring a first refrigerant pressure when the compressor is turned off;
   (b) turning on the compressor;
   (c) measuring a second refrigerant pressure after a predetermined time interval, wherein the predetermined time interval is sufficient to allow the compressor to establish a constant pressure in the cooling circuit;
   (d) forming a differential value from the second refrigerant pressure and the first refrigerant pressure; and
   (e) comparing the differential value with at least one reference value for detecting a fault in the cooling circuit.

2. The method as recited in claim 1, wherein steps (d) and (e) are carried out by a diagnostic tester.

3. The method as recited in claim 1, wherein the motor vehicle includes an engine which is turned on prior to step (a), the engine being in an idling mode during the measurements.

4. The method as recited in claim 3, wherein the engine is allowed to run for a period of 10 seconds to 30 seconds prior to step (a).

5. The method as recited in claim 3, wherein the engine is allowed to run for a period of about 20 seconds prior to step (a).

6. The method as recited in claim 3, wherein a time interval from turning on the compressor until measuring the second refrigerant pressure is 10 seconds to 50 seconds.

7. The method as recited in claim 3, wherein a time interval from turning on the compressor until measuring the second refrigerant pressure is about 30 seconds.

8. The method as recited in claim 1, wherein the reference value depends on the first refrigerant pressure when the compressor is turned off, a time interval from turning on the compressor until measuring the second refrigerant pressure, and an ambient temperature.

9. The method as recited in claim 1, further comprising: detecting a fault in the cooling circuit in step (e) when the differential value is smaller than the reference value.

10. The method as recited in claim 1, wherein the measurements of the first and second refrigerant pressures are carried out at a location in the cooling circuit just downstream from the compressor.

11. A diagnostic tester for ascertaining a fault in a cooling circuit of a motor vehicle that includes, in a flow direction of a refrigerant, a compressor, a condenser, an expansion device, and an evaporator, the diagnostic tester comprising:
   an arrangement for forming a differential value from a first refrigerant pressure in the cooling circuit ascertained with the compressor turned off, and a second refrigerant pressure ascertained after a predetermined time interval after turning on the compressor, wherein the predetermined time interval is sufficient to allow the compressor to establish a constant pressure in the cooling circuit; and
   an arrangement for comparing the differential value with at least one reference value to detect a fault in the cooling circuit.

12. The diagnostic tester as recited in claim 11, wherein the diagnostic tester is designed for connecting to a control unit.

13. The diagnostic tester as recited in claim 12, wherein the control unit includes one of a motor vehicle engine control unit and a motor vehicle air conditioning system control unit.

* * * * *